(12) United States Patent
Frank

(10) Patent No.: US 10,845,891 B2
(45) Date of Patent: Nov. 24, 2020

(54) DISPLAYING PROXIMATE KEYS IN A VIRTUAL REALITY ENVIRONMENT

(71) Applicant: Disney Enterprises, Inc., Burbank, CA (US)

(72) Inventor: Daniel Frank, Mountain View, CA (US)

(73) Assignee: Disney Enterprises, Inc., Burbank, CA (US)

( * ) Notice: Subject to any disclaimer, the term of this patent is extended or adjusted under 35 U.S.C. 154(b) by 33 days.

(21) Appl. No.: 15/282,918

(22) Filed: Sep. 30, 2016

(65) Prior Publication Data

US 2018/0095546 A1 Apr. 5, 2018

(51) Int. Cl.
*G06F 3/0489* (2013.01)
*G06F 3/023* (2006.01)
*G06F 3/01* (2006.01)
*G06F 1/16* (2006.01)
*G06F 3/042* (2006.01)

(52) U.S. Cl.
CPC ............ *G06F 3/0236* (2013.01); *G06F 1/163* (2013.01); *G06F 3/011* (2013.01); *G06F 3/0426* (2013.01); *G06F 3/0489* (2013.01); *G06F 3/04895* (2013.01)

(58) Field of Classification Search
CPC ...... G06F 3/017; G06F 3/0482; G06F 3/0488; G06F 3/04842; G06F 3/011; G06F 3/04886; G06F 3/04815; G06F 3/04812; G06F 3/0237; G06F 3/048; G06F 3/023; G06F 3/0236; G06F 3/04895; G06F 17/30026; G06F 17/218; G06F 17/276; G06F 3/013; H04N 21/482; H04N 21/44218; H04N 21/4438; H04N 13/044; A63F 13/06; A63F 13/92; A63F 13/285; A63F 13/211; A63F 13/21; A63F 13/218; A63F 13/5372; A63F 2300/1037; A63F 2300/1025; A63F 2300/105; A63F 2300/8082; A63F 2300/308; A63F 2300/1056; G06K 9/00671
See application file for complete search history.

(56) References Cited

U.S. PATENT DOCUMENTS

2006/0114233 A1* 6/2006 Radivojevic .......... G06F 3/0426
345/168
2012/0326961 A1* 12/2012 Bromer ................... G06F 3/044
345/156

(Continued)

*Primary Examiner* — Jennifer Mehmood
*Assistant Examiner* — James S Nokham
(74) *Attorney, Agent, or Firm* — Patterson + Sheridan, LLP

(57) ABSTRACT

A method, computer program product, and system are disclosed for generating a visual representation of at least one of a plurality of input keys. The embodiments receive a first signal form one or more proximity sensors indicating that a user is proximate to a first plurality of input keys on an I/O device. The embodiments receive a second signal from one or more activation sensors indicating the user has activated a second plurality of input keys on the I/O device. The embodiments compare the first plurality of input keys to the second plurality of input keys to identify a subset of the first plurality of input keys that the user is proximate to but has not activated. The embodiments generate a visual representation of the subset of the first plurality of input keys for display.

17 Claims, 6 Drawing Sheets

(56) References Cited

U.S. PATENT DOCUMENTS

| | | | |
|---|---|---|---|
| 2013/0194188 A1* | 8/2013 | Walker | G06F 3/038 |
| | | | 345/168 |
| 2014/0225822 A1* | 8/2014 | Underkoffler | G06F 3/017 |
| | | | 345/156 |
| 2014/0361976 A1* | 12/2014 | Osman | G02B 27/0172 |
| | | | 345/156 |
| 2017/0262045 A1* | 9/2017 | Rouvinez | G06T 19/006 |

* cited by examiner

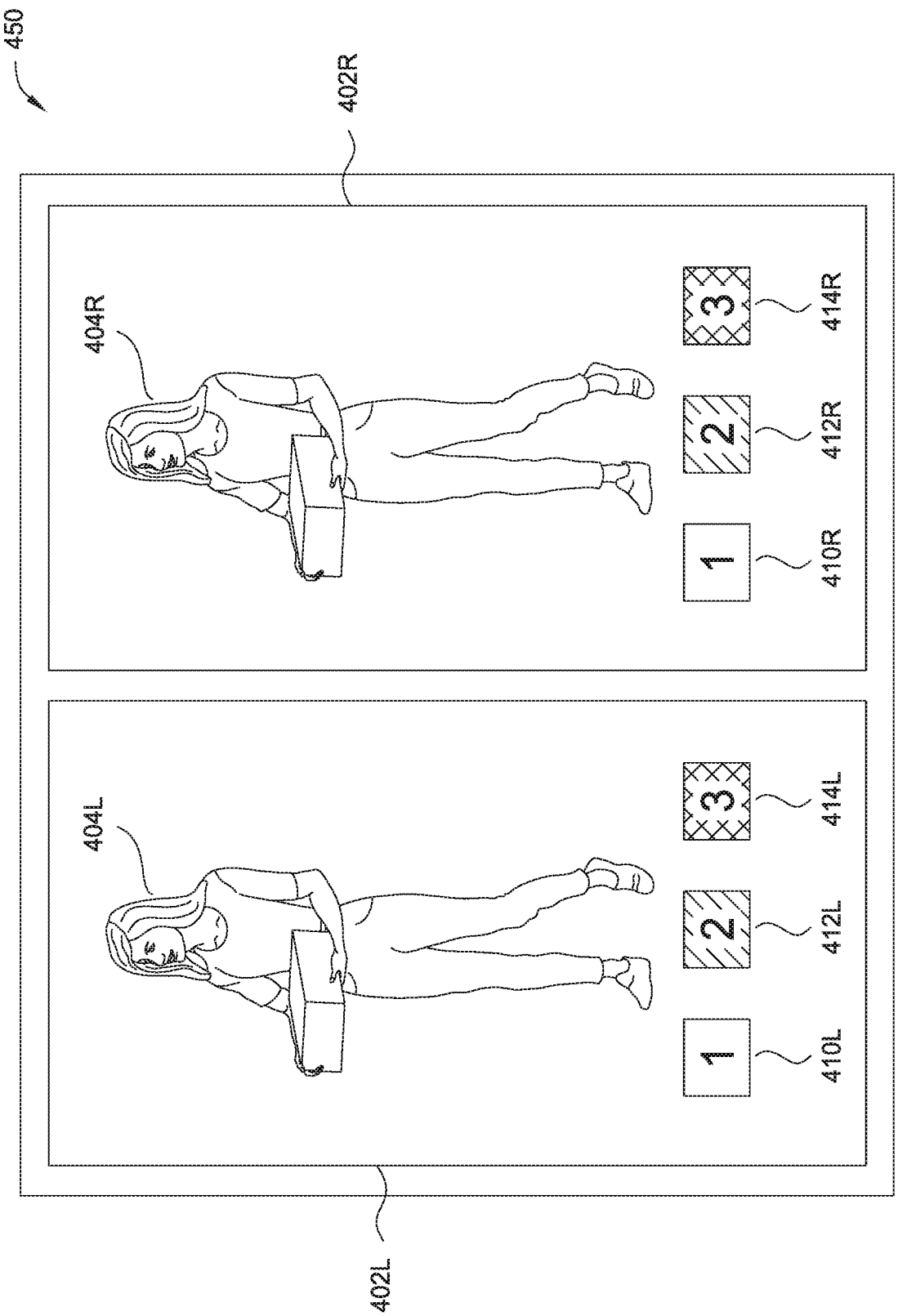

DISPLAYING PROXIMATE KEYS IN A VIRTUAL REALITY ENVIRONMENT

BACKGROUND

Field of the Invention

The embodiments herein are generally directed to determining proximity to an input.

Description of the Related Art

Computing devices generally require an input system for users to provide information to the computing devices—e.g., a keyboard, a mouse, a touch screen, and so forth—by providing signals which correspond to an activated input. However, a user generally needs to visually or tactually determine the location of a specific key or button to ensure the user activates the proper input. A visually impaired user—e.g., a person using a virtual reality headset, physically handicapped, and so forth—may not be able to determine the location of the specific input button they are searching for without activating the button. That is, if a user cannot see the input keys, the user may not know if she is about to activate the correct input until after the key is pressed and the computing system outputs a prompt—e.g., an audio prompt.

SUMMARY

One embodiment described herein is a method that includes receiving a first signal form one or more proximity sensors indicating that a user is proximate to a first plurality of input keys on an I/O device. The method includes receiving a second signal from one or more activation sensors indicating the user has activated a second plurality of input keys on the I/O device. The method includes comparing the first plurality of input keys to the second plurality of input keys to identify a subset of the first plurality of input keys that the user is proximate to but has not activated. The method includes generating a visual representation of the subset of the first plurality of input keys for display.

Another embodiment described herein is a system that includes one or more computing processors and a memory comprising a program that when executed by the one or more computer processors performs an operation for generating a visual representation of at least one of a plurality of input keys. The operation includes receiving a first signal from one or more proximity sensors indicating that a user is proximate to a first plurality of input keys on an I/O device. The operation includes receiving a second signal from one or more activation sensors indicating the user has activated a second plurality of input keys on the I/O device. The operation includes comparing the first plurality of input keys to the second plurality of input keys to identify a subset of the first plurality of input keys that the user is proximate to but has not activated. The operation includes generating a visual representation of the subset of the first plurality of input keys for display.

Another embodiment described herein is a computer program product to generate a visual representation of at least one of a plurality of input keys. The computer program product comprises a non-transitory computer-readable storage medium having computer-readable program code embodied therewith, the computer-readable program code configured to receive a first signal from one or more proximity sensors indicating that a user is proximate to a first plurality of input keys on an I/O device. The computer-readable program receives a second signal from one or more activation sensors indicating the user has activated a second plurality of input keys on the I/O device. The computer-readable program compares the first plurality of input keys to the second plurality of input keys to identify a subset of the first plurality of input keys that the user is proximate to but has not activated. The computer-readable program generates a visual representation of the subset of the first plurality of input keys for display.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

FIGS. 4A-4C illustrate graphical representations of a key proximity map, according to one embodiment described herein.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

When a user of a computing device is visually impaired, such as when using a virtual reality headset, a user may not know the location of an input key the user is looking for on a keyboard or the location of her hands on the keyboard as described above. To aid the user in determining if her fingers are proximate to the desired input, the embodiments herein provide a visual indication of the input keys the user is proximate to. For example, a keyboard may provide a signal to a computing device indicating the keys that are proximate to the user. The computing device provides a visual display to the user highlighting the aforementioned proximate keys.

In one exemplary embodiment, the input device is a keyboard that provides a signal to the computing device indicating which keys are proximate to a user. The keyboard is capable of distinguishing between a user being proximate to an input key and an input key being activated by the user (e.g., pressed down by the user). In one exemplary embodiment, the proximate keys are displayed on a virtual reality headset. In another exemplary embodiment, a sensor external from the keyboard determines which keys are proximate to the user such as a camera disposed over the keyboard.

In one exemplary embodiment, a controller receives a signal from one or more proximity sensors indicating the keys proximate to a user. The controller also receives a signal from one or more activation sensors indicating the keys a user has activated. The controller compares the proximate keys to the activated keys to determine the keys the user is proximate to but has not activated. The controller then generates a visual representation of the keys the user is proximate to but has not activated.

In one exemplary embodiment, the visual representation is a key map of the proximate keys. A key map is a graphical representation of the input keys of an input device. That is, much like a street map for a city, the key map provides a visual representation of the spatial relationship between the various keys of the input device so that a user knows precisely where a specific key is in relation to the other keys. Thus, the key map allows the user to ascertain if the user is in the proper location to activate the desired input key.

Figure 1:
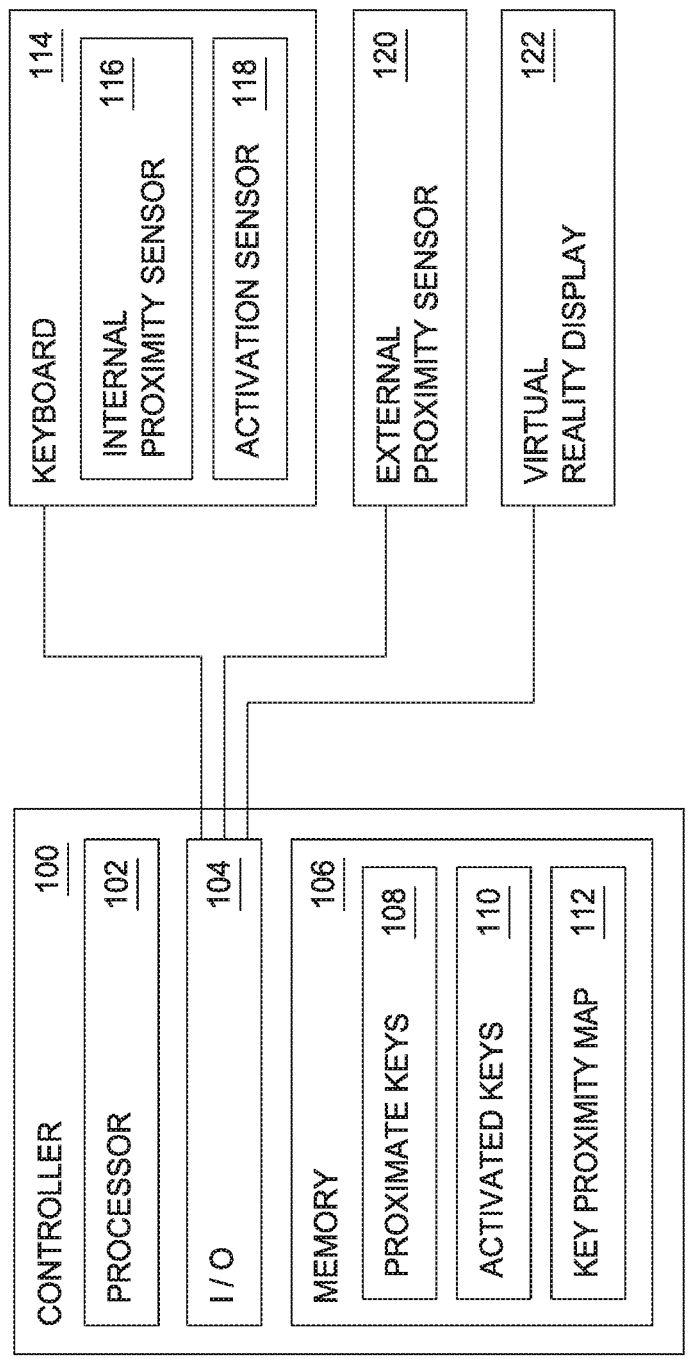
FIG. 1 illustrates a system for determining and displaying input keys proximate to a user, according to one embodiment described herein.

FIG. 1 illustrates a controller 100 for determining which keys are proximate to the user, according to one embodiment described herein. After identifying the proximate keys, the controller 100 displays this information to the user in a graphical representation on a display. That is, the controller 100 allows the user to determine which input keys the user will activate if she presses down so that the user ensures she will activate the desired input keys. As used herein, the term "proximate keys" or "keys proximate to the user" means the keys or buttons on a input device which a user's extremities are touching or hovering over. In contrast, the user activates an input key upon physically manipulating the input key such that an action corresponding to the key is performed by the computing system. For example, in one exemplary embodiment the user is proximate to a key of a keyboard when the user is touching the key but has not activated the key. The user may activate the key of the keyboard by depressing the key sufficiently far down such that the activation sensor associated with the key registers the key as activated. In response, the keyboard may transmit a signal to the computing system that performs an action corresponding to the pressed key.

As shown, the controller 100 includes a processor 102, input/output (I/O) ports 104, and a memory 106 including information on proximate keys 108, activated keys 110 and key proximity map 112, which will be described in more detail below. While controller 100 is shown as having a single processor 102 for simplicity, the controller 100 may include any number of processors. The processor 102 may include any processing element suitable for performing functions described herein, and may include a single or multiple core processor, as well as combinations thereof. The memory 106 may include a variety of computer-readable media selected for their size, relative performance, or other capabilities. The memory 106 may include cache, random access memory (RAM), storage, etc. Storage included as part of memory 106 may provide non-volatile memory for the controller 100, and may include one or more different storage elements such as Flash memory, a hard disk drive, a solid state drive, and an optical storage device.

In one exemplary embodiment, the controller 100 is connected via the I/O port 104 to a keyboard 114, an external proximity sensor 120, and a virtual reality display 122. While the I/O port 104 has not been illustrated with a wireless transceiver for communicating wirelessly, it is to be understood that the I/O port 104 can have the capability to communicate wirelessly with any of the aforementioned devices.

The keyboard 114 has an internal proximity sensor 116 and an activation sensor 118. The internal proximity sensor 116 detects which keys of the keyboard 114 a user is proximate to, and may provide a signal to the controller 100 indicating the proximate keys. The activation sensor 118 detects which keys of the keyboard 114 the user has activated, and may provide a signal to the controller 100 indicating the activated keys. In one exemplary embodiment, the internal proximity sensor 116 and the activation sensor 118 are pressure sensors. Both the internal proximity sensor 116 and the activation sensor 118 may be any type of sensor such as a resistance sensor, a capacitive sensor, a visual sensor (e.g., a camera, a laser), an electrical sensor (e.g., the user wears an electronic device that completes a circuit when the user touches the electrical sensor), and so forth.

For example, each button can have a resistance sensor which detects different levels of resistance based upon whether the user is touching a key versus activating a key. When the user places her finger on the button, the resistance sensor will detect a first resistance. If the user presses down, the resistance sensor will detect a second resistance indicating the user has activated the key. In a similar manner, a capacitive sensor may detect the finger of a user hovering over a key or touching the key by detecting a change in capacitance. As another example, the top of a key could contain an electrode which when contacted by the user completes an electrical circuit (e.g., the user's wrist could be contacting a ground electrode). Thus, a current can be detected flowing through the electrodes at the top of the keys to determine which ones the user is touching.

Further, while the internal proximity sensor 116 and activation sensor 118 are illustrated as separate sensors, this is not necessary as the proximity sensor 116 may be the same sensor as the activation sensor 118. For example, the proximity sensor 116 and the activation sensor 118 may be a pressure sensor. The pressure sensor is capable of determining when a user is resting her fingers on input keys versus when the user is activating one of the input keys. That is, the pressure sensor senses or detects pressure above a first pressure threshold indicating that a finger is touching, but not activating, the key. Once the user provides a predetermined amount of pressure above a second pressure threshold to the key, the pressure sensor determines the user is activating the key. Thus, based upon the amount of pressure provided by the user, the pressure sensor determines whether the keys are proximate to the user or the user is activating the keys. In this manner, the pressure sensor is capable of being both the proximity sensor 116 and the activation sensor 118.

In one exemplary embodiment, the keyboard 114 sends an activation signal having American Standard code for Information Interchange (ASCII) code to the controller 100 via Universal Serial Bus (USB) indicating which keys a user has activated. Thus, the keyboard 114 operates like a normal keyboard when an input key is activated. In one embodiment, the keyboard 114 may also send a proximate key signal having ASCII code indicating the keys a user is proximate to. In this example, the proximate key signal is not recognized as a signal associated with a keyboard. That is, the ASCII code relating to the proximate key signal may not be one a typical controller will recognize as coming from a keyboard. Thus, the keyboard 114 can still be used as a normal keyboard even if a specific computing device is not capable of recognizing the proximate key signal.

As shown, the controller 100 is connected to an external proximity sensor 120. The external proximity sensor 120 is a sensor external from the keyboard 114 that detects the keys a user is proximate to. The external proximity sensor 120 may send a signal to the controller 100 indicating which the keys that are proximate to the user. The external proximity sensor 120 may be any type of sensor which does not require physical contact from the user to determine the keys that are proximate to the user. Some non-limiting examples include a camera, a laser, an infrared (IR) sensor, and so forth. In one exemplary embodiment, the external sensor 120 is a camera sensor that provides images to the controller 100. The controller 100 may perform image analysis on the images provided by the external proximity sensor 120 to determine which the keys that are proximate to the user. In another exemplary embodiment, the external proximity sensor 120 is a laser which determines the keys the user is proximate to based upon where the user breaks the plane of the laser.

While the controller 100 is illustrated as using an internal proximity sensor 116 and an external proximity sensor 120 for ease of explanation, the controller 100 should not be limited to such an embodiment. The controller 100 may use any number of internal and/or external proximity sensors. Further, the controller 100 may use only one type of proximity sensor, e.g., only the internal proximity sensor 116 or only the external proximity sensor 120, for determining the keys proximate to the user.

In one exemplary embodiment, the controller 100 receives a signal from the internal proximity sensor 116 and/or the external proximity sensors 120 indicating the keys that are proximate to the user. The processor 102 processes the received signal to determine the proximate keys 108 and stores the data in memory 106. The controller 100 also receives a signal from the activation sensor 118 indicating the keys the user has activated. The processor 102 processes the received signal to determine the activated keys 110 and stores the data in memory 106. In another exemplary embodiment, the received signals do not require any processing and the controller 100 simply stores the provided information in the proximate keys 108 and the activated keys 110.

In one embodiment, the controller 100 uses the information stored in the proximate keys 108 and activated keys 110 to determine the key proximity map 112. The key proximity map 112 may be any data structure and/or visual representation of the proximate keys 108 and activated keys 110. For example, the key proximity map 112 may be a graphical representation of the keys a user is proximate to but has not activated.

In one embodiment, the controller 100 determines the key proximity map 112 by comparing the proximate keys 108 to the activated keys 110. That is, the controller 100 compares the proximate keys 108 with the activated keys 110 to identify the keys the user is proximate to but has not activated, and then stores the keys in the key proximity map 112. In another embodiment, the controller 100 stores information on both the proximate keys 108 and the activated keys 110 within the key proximity map 112. In another embodiment, the controller 100 generates a graphical representation of the proximate keys 108 and activated keys 110 as the key proximity map 112.

In one exemplary embodiment, the controller 100 provides a graphical representation of the key proximity map 112 to the virtual reality display 122 so that the user receives a visual indication of which input keys are proximate to the user. The virtual reality display 122 may be any type of output device such as a projector, a display screen (e.g., monitor, television, touch screen), a holographic display, an augmented reality display, and so forth. In one exemplary embodiment, the virtual reality display 122 is a head mounted display which completely encompasses the user's view. That is, the user only visually perceives the head mounted display because the display completely surrounds the user's vision. Thus, the user is visually disconnected from the environment around them and is unable to see the location of the user's fingers on the input keys.

Figure 2:
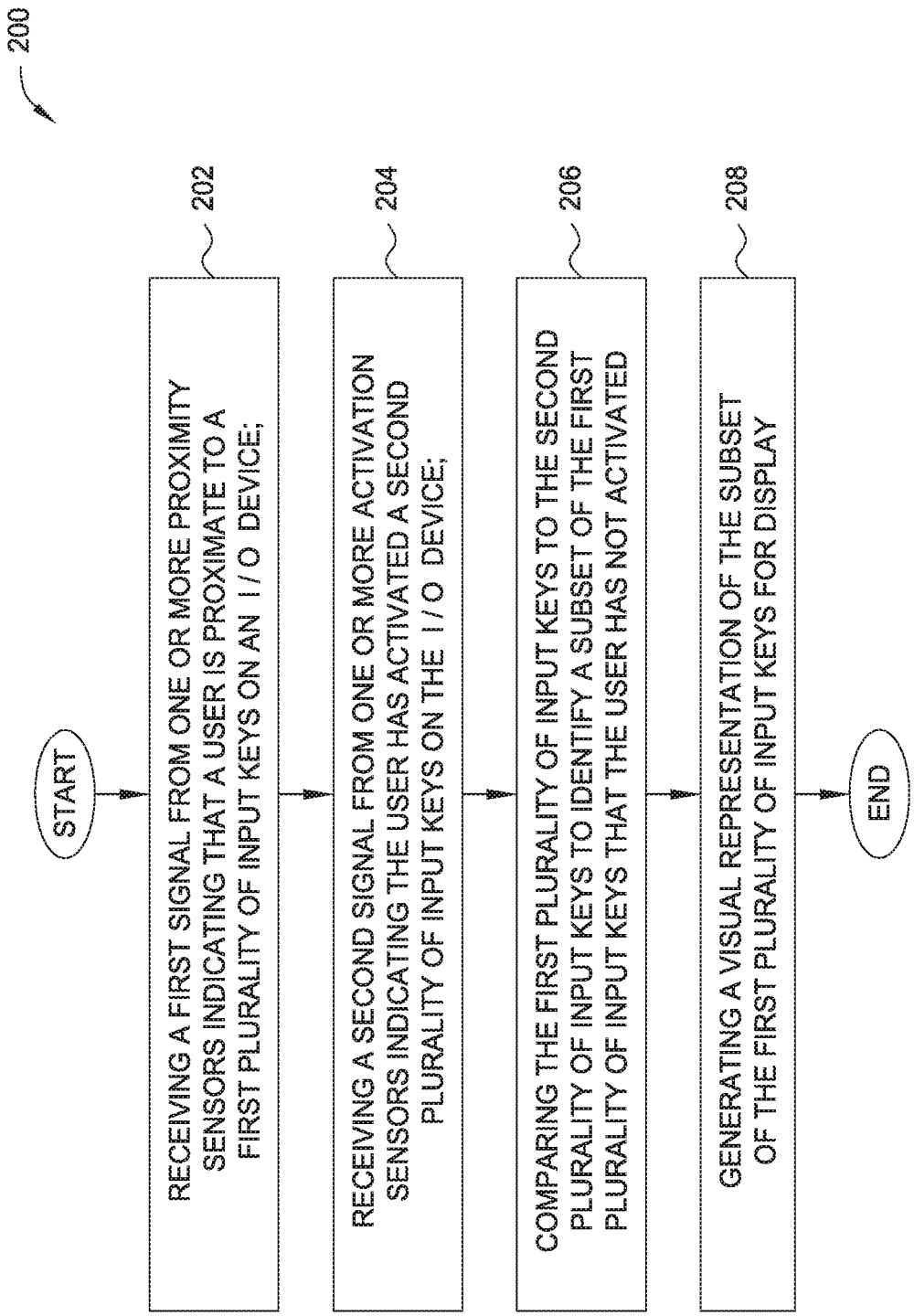
FIG. 2 is a flowchart for determining and displaying input keys proximate to a user, according to one embodiment described herein.

FIG. 2 is a flowchart for determining the keys proximate to a user while the user is using a virtual reality headset, according to one embodiment described herein. To better understand FIG. 2, reference will be made to FIG. 3 which generally illustrates a person using a virtual reality computing device. As shown in view 300, user 302 is interacting with a personal computer (PC) 304. The PC 304 is connected via I/O to a virtual reality headset 306, a keyboard 308, a mouse 310, and an external proximity sensor 312. In one embodiment, the PC 304 comprises the controller 100. In another embodiment, the keyboard 308 comprises the controller 100. For example, the keyboard 308 may have a processor and memory sufficient to perform the functions of the controller 100 as described herein.

While using the virtual reality headset 306, the user 302 is unable to see the keyboard 308 and mouse 310 because the virtual reality headset 306 completely encompasses user 302's view. Thus, the user 302 may be unsure of where to place their hands on the keyboard 308 in order to activate the desired input key. That is, if user 302 is playing a video game which requires their hands be placed away from the tactile indicators on a keyboard (i.e., the physical nubs on the "F" and "J" keys), the user 302 has no idea if their hands are above the proper key before the key is activated. For example, if the video game user 302 is playing requires the use of the "1", "2", "3", and "4" keys, the user 302 has no immediate reference as to where the aforementioned keys are located on the keyboard. Thus, using a typical keyboard, the user would first have to activate the keys in order to know if the user's fingers are on the desired keys.

Figure 3:
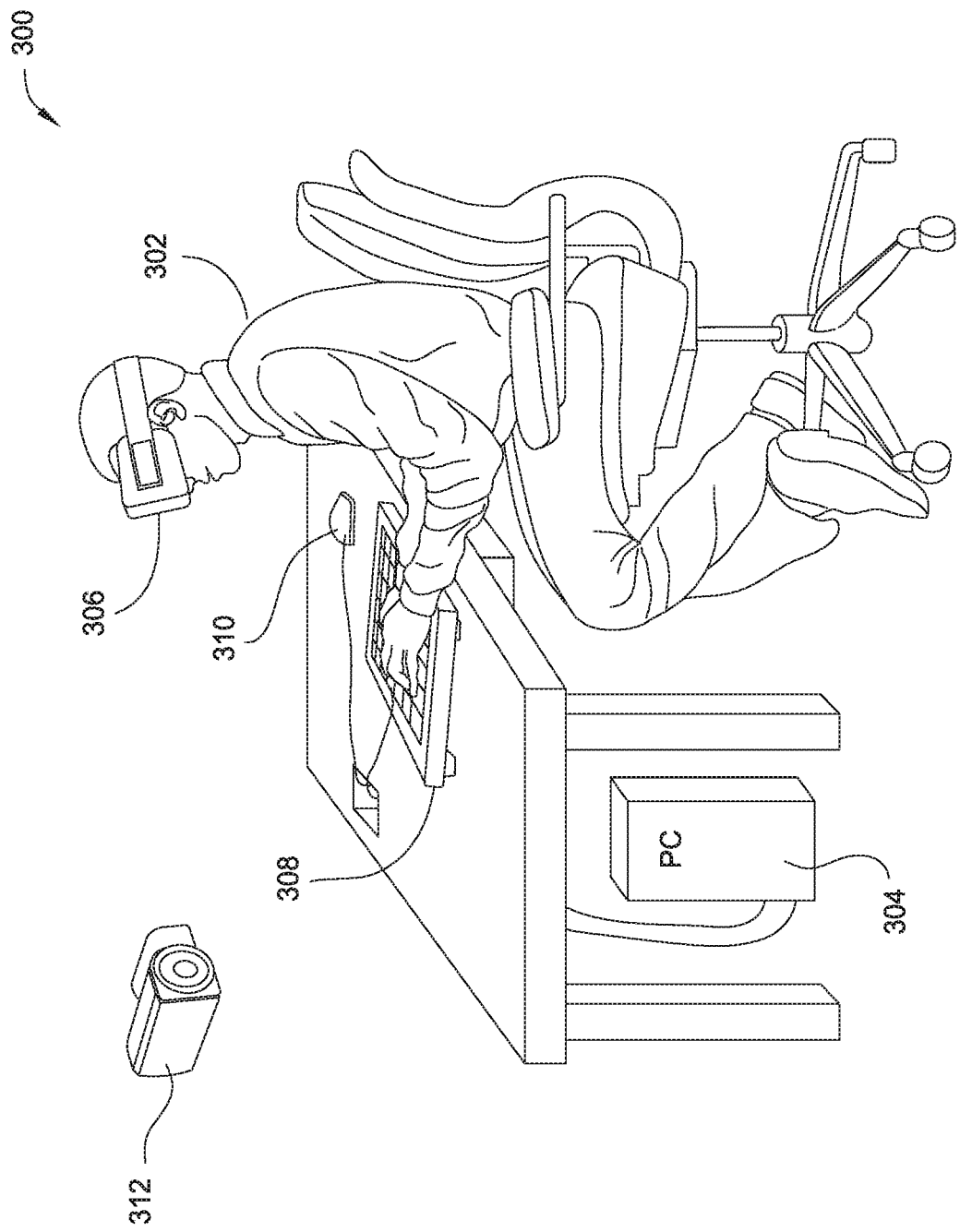
FIG. 3 illustrates a system for determining and displaying input keys proximate to a user using a virtual reality display device, according to one embodiment described herein.

Returning to FIG. 2, at block 202 the controller 100 receives a first signal from one or more proximity sensors indicating that a user is proximate to a first plurality of input keys on an I/O device. For example, as illustrated in FIG. 3, the user 302 may rest their hands on a plurality of keys on the keyboard 308 (e.g., touch but not activate). In one embodiment, the keyboard 308 sends a signal to the PC 304 indicating the keys proximate to the user 302. That is, the keyboard 308 sends a signal indicating the keys the user 302 has rested their fingers on. In another embodiment, the external proximity sensor 312 sends a signal to the PC 304 indicating the keys proximate to the user 302.

Returning to FIG. 2, at block 204, the controller 100 receives a second signal from one or more activation sensors indicating the user has activated a second plurality of input keys on the I/O device. For example, the keyboard 308 of FIG. 3 may have one or more activation sensors to indicate when user 302 activates a key. That is, the user 302 may press down sufficiently hard on a plurality of keys on the keyboard 308 to activate the keys. The keyboard 308 may send a signal to the PC 304 indicating the activated keys.

Returning to FIG. 2, at block 206, the controller 100 compares the first plurality of input keys to the second plurality of input keys to identify a subset of the first plurality of input keys that the user has not activated. That is, in one embodiment, the controller 100 compares the proximate keys 108 with the activated keys 110 to identify the keys the user is proximate to but has not activated. For example, the user may have her fingers disposed over the "A," "S," "D," and "F" keys but only activated the "A" key. Thus, the user is proximate to, but has not activated, the "S," "D," and "F" keys.

At block 208, the controller 100 generates a visual representation of the subset of the first plurality of input keys for display. In one exemplary embodiment, the controller 100 generates a visual representation and provides the visual representation via the virtual reality headset to the user. For example, the controller 100 determines the key proximity map 112 should comprise the "W," "A," "S," and "D" keys. The controller 100 then provides the graphical representation of the "W," "A," "S," and "D" keys to the virtual reality headset as illustrated in FIGS. 4A and 4B.

Figure 4A:
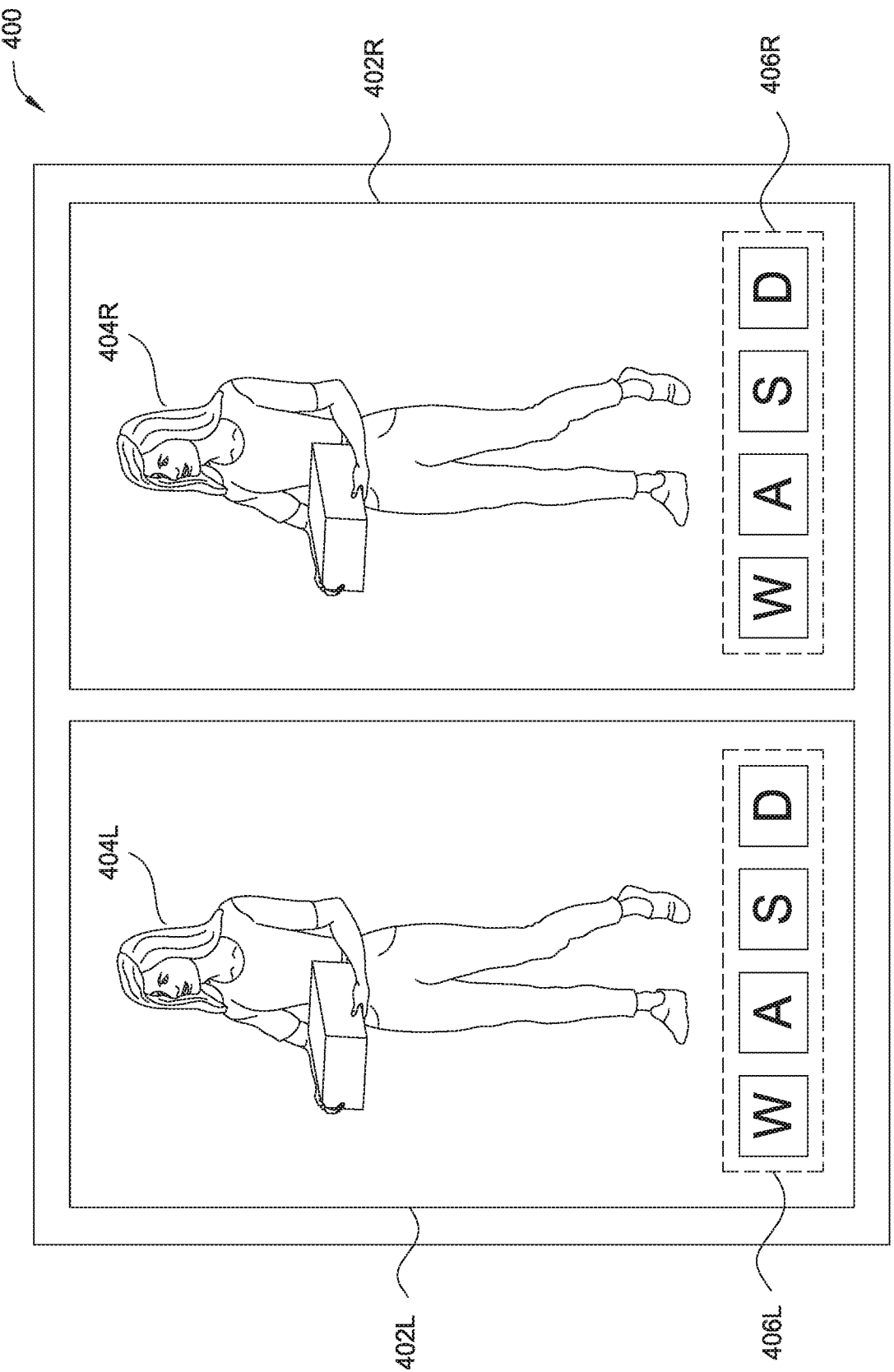
Figure 4B:
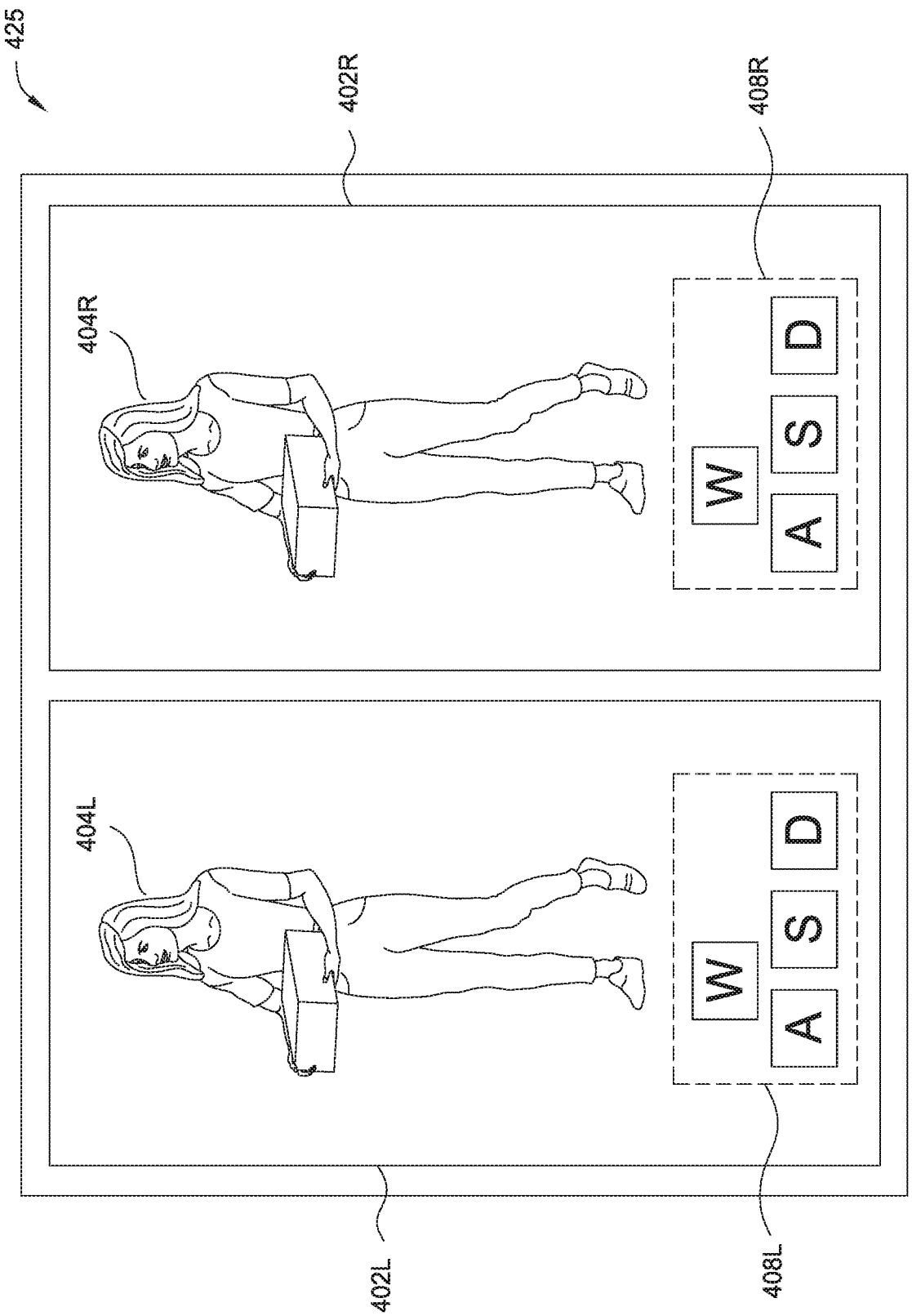

As shown, FIG. 4A illustrates view 400 of the inside of a virtual reality headset according to one embodiment. There are two display screens shown, 402L and 402R, one for the left eye and the one for the right eye. Both screens display a similar image but have different points of view to ensure the images on the screen are cohesive between the two eyes. As shown, there is a person 404 displayed on both the left (404L) and the right (404R) display screens 402. Further, there is a key proximity map 406 displayed on both the left (406L) and the right (406R) display screens 402. As shown, the key proximity map 406 highlights that the user is proximate to the "W," "A," "S," and "D" keys by displaying the aforementioned keys in a straight line at the bottom of the display screens 402. While the keys are displayed as a square with the character the key represents in the middle, the keys may be represented in any graphical manner such as a simple outline of the character, the character with a background, different colors, and so forth. Further, while view 400 shows a virtual reality headset, the key proximity map 406 may be displayed on any display such as a television, a projector, a touch screen, and so forth.

In one embodiment, once the user is no longer proximate to a displayed key (e.g., the user moves their finger off the key, activates the key), the key is no longer shown on the displays 402. In another embodiment, if the user stays proximate to a key for longer than a predetermined amount of time (e.g., longer than five seconds), the key is no longer displayed. In one embodiment, the user is capable of adjusting the settings for how the key proximity map 406 is displayed such as the size, length displayed, color, format, and so forth.

Further, while the key proximity map 406 has been displayed graphically, the key proximity map 406 may also be provided in an auditory manner to a user. For example, if the user is blind and is unable to visually perceive the displays, the controller 100 may provide an auditory indication of which keys the user is proximate to. In this manner, the controller 100 is capable of providing the key proximity map graphically and/or auditorily to a user.

FIG. 4B illustrates view 425 of the inside of a virtual reality headset according to one embodiment. Similar to FIG. 4A, view 425 illustrates a person 404 within a left display screen 402L and a right display screen 402R with a key proximity map 408. The key proximity map 408 displays the W, A, S, and D keys as they appear on a keyboard. Thus, instead of having a line of the keys the user is proximate to displayed (as shown in FIG. 4A), the user views a graphical representation of a keyboard with only the proximate keys shown.

In another embodiment, the user views a graphical representation of an entire keyboard with the proximate keys highlighted. That is, instead of only the proximate keys shown to the user, an image of the entire keyboard is provided to the user with the proximate keys conspicuously displayed such that the user readily distinguishes the proximate keys from the remaining keys of the keyboard. For example, the proximate keys may be significantly larger when compared to the other keys of the keyboard. As another example, the proximate keys may be displayed in, or outlined by, a noticeable color (e.g., orange, red, green, and so forth) while the remaining keys of the keyboard are black and white. Further, the proximate keys may be displayed with a noticeable effect such as a flashing color, changing between multiple colors, a noticeable background (e.g., hash marks, dots), and so forth. While the proximate keys have been described as embodying the aforementioned highlighting, it is to be understood that any part of the proximate key is capable of being highlighted. Some non-limiting examples include the exterior/interior of the key, the character of the key, the background of the key, the outline of the key, and so forth. In this manner, the controller 100 is capable of providing the user a visual image of the keyboard that highlights the keys the user is proximate to.

FIG. 4C illustrates view 450 of the inside of a virtual reality headset according to one embodiment. View 450 illustrates a person 404 within a left display screen 402L and a right display screen 402R with a key proximity map comprising key 410, key 412, and key 414 on both display screens. Each key has a different background to indicate a different status of the key (e.g., proximate, activated, neither). Keys 410 indicate that the "1" character is not proximate nor activated by the user, which is why the keys 410 have no highlighting. The keys 412 have a background indicating that the user is proximate to the "2" character. The keys 414 have a different background indicating that the user is activating the "3" character. Thus, the controller 100 is capable of providing a visual indication of whether a user is proximate to a key, has activated a key, or neither. In this manner, the controller 100 is capable of providing visual information to a user about the keys the user is interacting with.

In the preceding, reference is made to embodiments of the invention. However, it should be understood that the invention is not limited to specific described embodiments. Instead, any combination of the preceding features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method, comprising:
receiving a first signal from one or more proximity sensors indicating that a user is proximate to a first subset of a first plurality of input keys on an I/O device, wherein the user is proximate to the first subset of input keys when a portion of the user is touching or hovering over the first subset of input keys;
receiving a second signal from one or more activation sensors indicating the user has activated a second plurality of input keys of the first subset of input keys on the I/O device, wherein the second plurality of input keys comprises input keys the user has physically manipulated;
comparing the first subset of input keys to the second plurality of input keys to identify a second subset of the first plurality of input keys that the user is proximate to but has not activated;

displaying a key proximity map of the second subset of input keys on a display, wherein only the second subset of input keys are displayed;

after a predetermined time, receiving a third signal indicating the portion of the user remains touching or hovering over a third subset of the second subset of input keys during the predetermined time; and removing the third subset of input keys from the display.

2. The method of claim 1, wherein the display is an encompassing head mounted virtual reality display, wherein the user only visually perceives the encompassing head mounted virtual reality display.

3. The method of claim 1, wherein:
the one or more proximity sensors and the one or more activation sensors are pressure sensors;
the user activates a first input key of the first subset of input keys by providing a predetermined pressure on the first input key; and
the first signal indicates that the user is proximate to the first input key when the user touches the first input key but does not provide the predetermined pressure to activate the first input key.

4. The method of claim 1, wherein the first and second signals are communicated via a universal serial bus (USB) connection and comprise an American Standard Code for Information Interchange (ASCII) code.

5. The method of claim 1, wherein the one or more proximity sensors are at least one of a capacitive sensor, an electrode sensor, a pressure sensor, or a visual sensor.

6. The method of claim 1, further comprising generating a second key proximity map of the second plurality of input keys for display, wherein the second key proximity map comprises a different visual representation than the key proximity map.

7. A system, comprising:
one or more computing processors; and
a memory comprising a program that when executed by the one or more computer processors performs an operation for generating a visual representation of at least one of a plurality of input keys, the operation comprising:
receiving a first signal from one or more proximity sensors indicating that a user is proximate to a first subset of a first plurality of input keys on an I/O device, wherein the user is proximate to the first subset of input keys when a portion of the user is touching or hovering over the first subset of input keys;
receiving a second signal from one or more activation sensors indicating the user has activated a second plurality of input keys of the first subset of input keys on the I/O device, wherein the second plurality of input keys comprises input keys the user has physically manipulated;
comparing the first subset of input keys to the second plurality of input keys to identify a second subset of the first plurality of input keys that the user is proximate to but has not activated;
displaying a key proximity map of the second subset of input keys on a display, wherein only the second subset of input keys are displayed;
after a predetermined time, receiving a third signal indicating the portion of the user remains touching or hovering over a third subset of the second subset of input keys during the predetermined time;
updating the key proximity map to remove the third subset of input keys; and
removing input keys of the third subset from the display.

8. The system of claim 7, wherein the display is an encompassing head mounted virtual reality display, wherein the user only visually perceives the encompassing head mounted virtual reality display.

9. The system of claim 7, wherein:
the one or more proximity sensors and the one or more activation sensors are pressure sensors;
a first input key of the first subset of input keys is configured to be activated by the user providing a predetermined pressure on the first input key; and
the first signal is configured to indicate that the user is proximate to the first input key when the user touches the first input key but does not provide the predetermined pressure to activate the first input key.

10. The system of claim 7, wherein the first and second signals are communicated via a universal serial bus (USB) connection and comprise an American Standard Code for Information Interchange (ASCII) code.

11. The system of claim 7, wherein the one or more proximity sensors are at least one of a capacitive sensor, an electrode sensor, a pressure sensor, or a visual sensor.

12. The system of claim 7, wherein the operation further comprises generating a second key proximity map of the second plurality of input keys for display, wherein the second key proximity map comprises a different visual representation than the key proximity map.

13. A computer program product to generate a visual representation of at least one of a plurality of input keys, the computer program product comprising:
a non-transitory computer-readable storage medium having computer-readable program code embodied therewith, the computer-readable program code configured to:
receive a first signal from one or more proximity sensors indicating that a user is proximate to a first subset of a first plurality of input keys on an I/O device, wherein the user is proximate to the first subset of input keys when a portion of the user is touching or hovering over the first subset of input keys;
receive a second signal from one or more activation sensors indicating the user has activated a second plurality of input keys of the first subset on the I/O device, wherein the second plurality of input keys comprises input keys the user has physically manipulated;
compare the first subset to the second plurality of input keys to identify a second subset of the first plurality of input keys that the user is proximate to but has not activated;
display a key proximity map of the second subset of input keys on a display, wherein only the second subset of input keys are displayed;
after a predetermined time, receiving a third signal indicating the portion of the user remains touching or hovering over a third subset of input keys of the second subset during the predetermined time; and
removing input keys of the third subset from the display.

14. The computer program product of claim 13, wherein the display is an encompassing head mounted virtual reality display, wherein the user only visually perceives the encompassing head virtual reality mounted display.

15. The computer program product of claim 13, wherein:
the one or more proximity sensors and the one or more activation sensors are pressure sensors;

a first input key of the first subset of input keys is configured to be activated by the user providing a predetermined pressure on the first input key; and the first signal is configured to indicate that the user is proximate to the first input key when the user touches the first input key but does not provide the predetermined pressure to activate the first input key.

16. The computer program product of claim 13, wherein the first and second signals are communicated via a universal serial bus (USB) connection and comprise an American Standard Code for Information Interchange (ASCII) code.

17. The computer program product of claim 13, wherein the one or more proximity sensors are at least one of a capacitive sensor, an electrode sensor, a pressure sensor, or a visual sensor.

* * * * *